United States Patent [19]
Sadakane et al.

[11] Patent Number: 5,722,365
[45] Date of Patent: Mar. 3, 1998

[54] FUEL INJECTION CONTROL DEVICE FOR ENGINE

[75] Inventors: Shinji Sadakane, Susono; Hiroki Ichinose, Fujinomiya, both of Japan

[73] Assignee: Toyota Jidosha Kabushiki Kaisha, Aichi, Japan

[21] Appl. No.: 658,047

[22] Filed: Jun. 4, 1996

[30] Foreign Application Priority Data

Jun. 5, 1995 [JP] Japan ................................. 7-137723

[51] Int. Cl.⁶ .............................. F02D 41/06; F02D 9/00
[52] U.S. Cl. ........................ 123/336; 123/442; 123/491
[58] Field of Search ........................... 123/179.16, 179.18, 123/336, 442, 491

[56] References Cited

U.S. PATENT DOCUMENTS

| | | | |
|---|---|---|---|
| 5,477,826 | 12/1995 | Hara et al. | 123/339.16 |
| 5,492,095 | 2/1996 | Hara et al. | 123/339.19 |
| 5,542,388 | 8/1996 | Ichinose et al. | 123/336 |
| 5,596,957 | 1/1997 | Ichinose et al. | 123/179.18 |
| 5,632,249 | 5/1997 | Sadakane et al. | 123/442 |

FOREIGN PATENT DOCUMENTS

| | | |
|---|---|---|
| 61-19968A | 1/1986 | Japan. |
| 63-143349A | 6/1988 | Japan. |
| 1-119874 U | 8/1989 | Japan. |
| 6-229353A | 8/1994 | Japan. |

Primary Examiner—Tony M. Argenbright
Attorney, Agent, or Firm—Kenyon & Kenyon

[57] ABSTRACT

A fuel injection control device for an engine including an intake air control valve arranged in the intake passage comprises a fuel injector arranged in the downstream of the intake air control valve. In the engine starting operation, the intake air control valve is closed. After the completion of the engine starting operation, the intake air control valve is controlled to make the opening thereof equal to the intermediate opening, and the fuel injection time is calculated based on the negative pressure in the intake passage upstream of the intake air control valve. During a delay period in which the opening of the intake air control valve is smaller than the intermediate opening, the fuel injection time is reduced based on the actual opening of the intake air control valve and on the engine speed, to thereby make the fuel amount to be injected equal to the suitable amount.

22 Claims, 11 Drawing Sheets

FUEL INJECTION CONTROL DEVICE FOR ENGINE

BACKGROUND OF THE INVENTION

1. Field of the Invention

The present invention relates to a fuel injection control device for an engine.

2. Description of the Related Art

Japanese Unexamined Utility Model Publication No. 1-119874 discloses a fuel injection control device for an engine having an intake air control valve arranged in the intake passage. A fuel injector is arranged in the intake passage downstream of the intake air control valve. The intake air control valve is kept closed during an engine starting operation, that is, for example, from when the starting motor starts until the engine speed increases over a predetermined speed, to thereby produce an increased negative pressure in the intake passage downstream of the intake air control valve. Such an increased negative pressure promotes the vaporization and the atomization of the injected fuel, and thereby reduces an amount of unburned hydrocarbons exhausted into the exhaust passage.

In the typical engine, a fuel injection time required to make the air-fuel ratio equal to a target air-fuel ratio, such as a stoichiometric air-fuel ratio, is calculated in accordance with the intake air amount of the engine, after the engine starting operation completes. To detect the intake air amount, a pressure sensor may be arranged in the intake passage upstream of the intake air control valve, such as the surge tank, and the intake air amount is calculated based on the detected negative pressure.

On the other hand, although the engine starting operation has been completed and the intake air control valve is controlled to be opened, the intake air control valve does not open immediately and opens after a certain period has passed. Namely, a delay period exists. However, the negative pressure in the intake passage upstream of the intake air control valve is substantially the atmospheric pressure during the delay period, and thus the intake air amount calculated based on the negative pressure is larger than the actual intake air amount during the delay period. As a result, the calculated fuel injection time during the delay period is longer than a suitable injection time. This deteriorates the combustion of the air-fuel mixture in the combustion chamber, and thereby increases the amount of unburned hydrocarbons, during the delay period.

SUMMARY OF THE INVENTION

An object of the present invention is to provide a fuel injection control device for an engine able to calculate the appropriate fuel injection time during the delay period of the intake air control valve.

According to the present invention, there is provided a fuel injection control device for an engine having an intake passage and an intake air control valve arranged therein and controlled by an actuator, the actuator controlling the intake air control valve to be closed in an engine starting operation, and to be opened after the completion of the engine starting operation, the device comprising: a fuel injector arranged in the intake passage downstream of the intake air control valve for injecting fuel into the intake passage; a pressure sensor arranged in the intake passage upstream of the intake air control valve for detecting a negative pressure therein; engine starting operation determining means for determining whether the engine starting operation is in process or has been completed; first fuel amount calculating means for calculating a fuel amount to be injected by the fuel injector based on the negative pressure detected by the pressure sensor when the determining means determines that the engine starting operation has been completed; delay period detecting means for detecting a delay period of the intake air control valve; and fuel amount reducing means for reducing the fuel amount calculated by the first fuel amount calculating means during the delay period.

The present invention may be more fully understood from the description of the preferred embodiments of the invention set forth below, together with the accompanying drawings.

DESCRIPTION OF THE PREFERRED EMBODIMENTS

Figure 1:
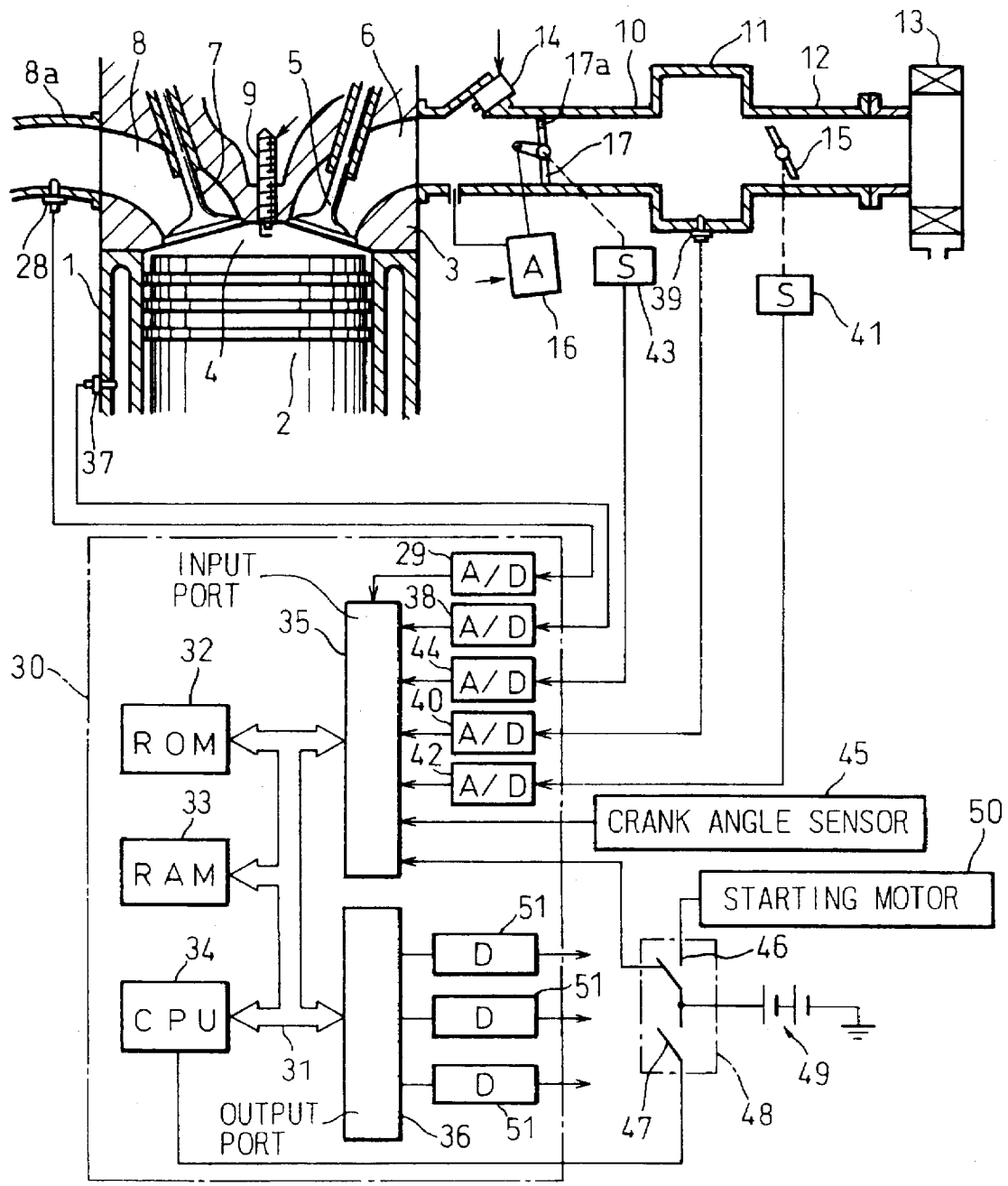
FIG. 1 is a general view of an engine.

An internal combustion engine shown in FIG. 1 has, for example, four cylinders, but only one cylinder is depicted in FIG. 1.

Referring to FIG. 1, a reference numeral 1 designates a cylinder block, 2 designates a piston reciprocating in the cylinder block 1, 3 designates a cylinder head fixed to the top of the cylinder block 1, and 4 designates a combustion chamber defined between the top of the piston 2 and the cylinder head 3. Further, 5 designates an intake valve arranged in an intake port 6 in the cylinder head 3, 7 designates an exhaust valve arranged in an exhaust port 8 in the cylinder head 3, and 9 designates a spark plug arranged on an inner wall of the cylinder head 3.

Each intake port 6 is connected to a surge tank 11 via a corresponding branch 10. The surge tank 11 is connected to an intake duct 12, and the intake duct 12 is connected to an air cleaner 13. In the intake duct 12, a throttle valve 15 is arranged, an opening TA of which is enlarged as a depression of an accelerator pedal (not shown) is made larger. Also, in each branch 10, an intake air control valve 17 is arranged. In each branch 10 downstream of the intake air control valve 17, a fuel injector 14 is provided for injecting fuel into the branch 10. The spark plug 9 and the fuel injectors 14 are controlled by signals output from an electronic control unit 30, respectively. The exhaust ports 8 are connected to a common exhaust manifold 8a, which is connected to a catalytic converter (not shown).

The intake air control valve 17 is driven by a driver 16, which controls the intake air control valve 17 to make an opening of the intake air control valve 17 equal to a target opening DTGT. In this embodiment, the intake air control valve 17 is a butterfly valve, and the valve body thereof includes an aperture 17a having a very small cross-section. On the other hand, the driver 16 is constructed as an actuator of a negative pressure type, as shown in FIG. 2. Alternatively, the driver 16 may be constructed as an actuator of a electromagnetic type.

Referring to FIG. 2, the actuator 16 comprises a vacuum storing chamber 18 connected to the branch 10 downstream of the intake air control valve 17 to store the negative pressure produced therein; and a first and a vacuum chambers 20 and 22, each of which is selectively connected to the atmosphere or the vacuum storing chamber 18 via a first and a second vacuum control valves 19 and 21, respectively. Diaphragms 23 and 24 defining the first and the second vacuum chambers 20 and 22, respectively, are connected to the intake air control valve 17 via a common rod, and are biassed by a corresponding return spring to reduce the displacements thereof. The first and the second vacuum control valves 19 and 21 are controlled by signals output from an electronic control unit 30, respectively.

Figure 2A:
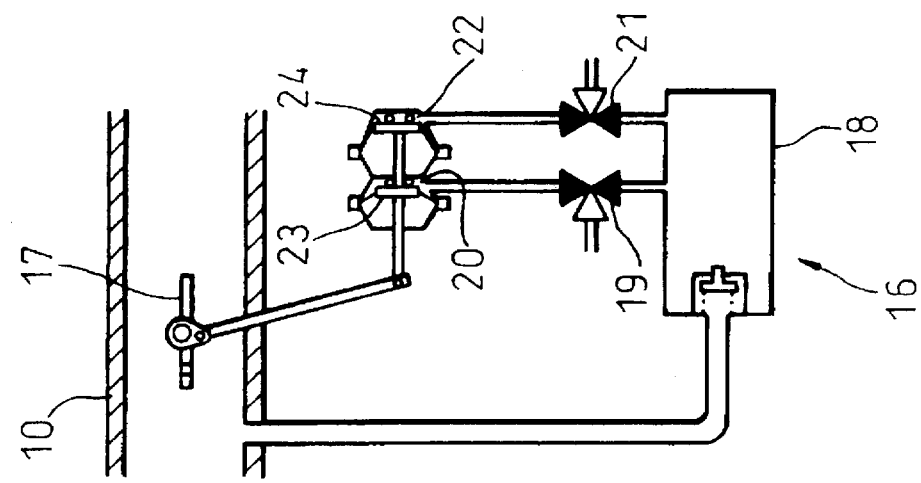
FIGS. 2A to 2C illustrate different openings of an intake air control valve.

When the intake air control valve 17 is to be closed, namely, when the target opening DTGT of the intake air control valve 17 is zero, the first and the second vacuum control valves 19 and 21 introduce the atmospheric pressure into the first and the second vacuum chambers 20 and 22, respectively. In this condition, the diaphragms 22 and 23 do not displace as shown in FIG. 2A, and thereby the intake air control valve 17 is closed, namely, the actual opening DACT of the intake air control valve 17 is made zero.

Figure 2B:
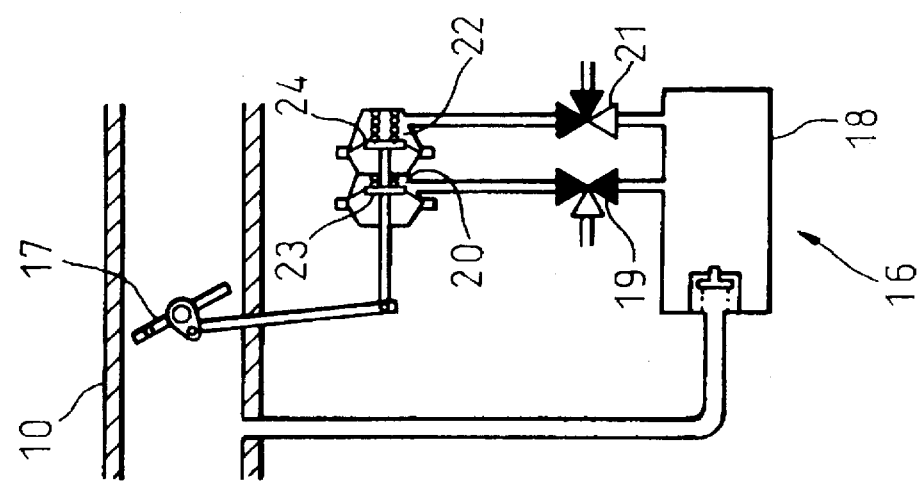

When the intake air control valve 17 is to be partially opened, namely, the target opening DTGT is a intermediate opening MID between zero and the maximum opening FLAX, the first vacuum control valve 19 introduces the negative pressure in the vacuum storing chamber 18 into the first vacuum chamber 20, and the second vacuum control valve 21 introduces the atmospheric pressure into the second vacuum chamber 22. In this condition, the diaphragms 22 and 23 slightly displace as shown in FIG. 2B, and thereby the intake air control valve 17 is partially opened, namely, the actual opening DACT of the intake air control valve 17 is made the intermediate opening MID.

Figure 2C:
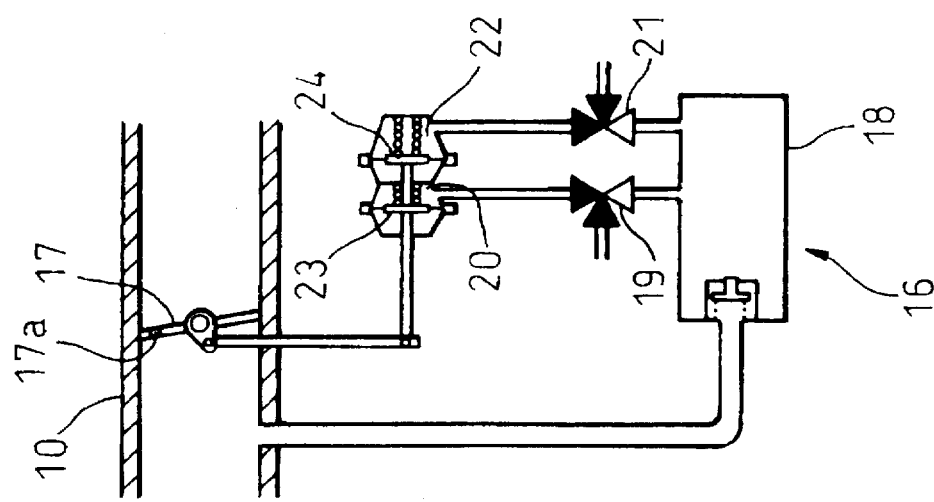

When the intake air control valve 17 is to be fully opened, namely, when the target opening DTGT is the maximum opening MAX, the first and the second vacuum control valves 19 and 21 introduce the negative pressure in the vacuum storing chamber 18 into the first and the second vacuum chambers 20 and 22, respectively. In this condition, the diaphragms 22 and 23 displace as shown in FIG. 2C, and thereby the intake air control valve 17 is fully opened, namely, the actual opening DACT of the intake air control valve 17 is made the maximum opening MAX.

Referring to FIG. 1 again, the electronic control unit 30 is constructed as a digital computer and comprises a read-only memory (ROM) 32, a random-access memory (RAM) 33, the CPU (micro processor) 34, an input port 35, and an output port 36. ROM 32, RAM 33, CPU 34, the input port 35, and the output port 36 are interconnected to each other via a bidirectional bus 31. A air-fuel ratio sensor 28 is arranged in the exhaust manifold 8a, and generates an output voltage in accordance with the air-fuel ratio. The output voltage of the sensor 28 is output to the input port 35 via an AD converter 29. A water temperature sensor 37 is arranged in the cylinder block 1, and generates an output voltage in proportion to the temperature THW of cooling water of the engine. The output voltage of the water temperature sensor 37 is output to the input port 35 via an AD converter 38.

A pressure sensor 39 is arranged in the surge tank 11. The pressure sensor 39 generates an output voltage in proportion to the negative pressure in the surge tank 11, and this output voltage is input to the input port 35 via an AD converter 40. According to the output signal, the CPU 34 calculates the intake air amount QA of the engine. In this way, an air-flow meter of, for example, a vane type, is unnecessary between the throttle valve 15 and the air cleaner 13. This reduces the pumping loss of the engine. Further, an arrangement of the pressure sensor 39 in the surge tank 11 assures the dynamic range of the sensor 39, while reduces the undesirable influences of the pulsation of intake air flow on the output signals of the pressure sensor 39.

An opening sensor 41, which generates an output voltage in proportion to an opening TA of the throttle valve 15, is connected to the throttle valve 15. The output voltage of the opening sensor 41 is output to the input port 55 via an AD converter 42. An opening sensor 43, which generates an output voltage in proportion to the actual opening of the intake air control valve 17, is connected to the intake air control valve 17. The output voltage of the opening sensor 43 is output to the input port 55 via an AD converter 44. The input port 35 is also connected to a crank angle sensor 45, which generates a pulse whenever a crankshaft is turned by, for example, 30 degrees. According to these pulses, the CPU 34 calculates the engine speed N.

Further, to the input port 35 is input a signal representing whether a starting motor switch 46 is ON or OFF. The starting motor switch 46 with an ignition switch 47 constitutes a key switch 48, and is turned ON only when the ignition switch 47 is turned ON. When the ignition switch 47 is turned ON, the power is supplied from a buttery 49 to the CPU 34. When the starting motor switch 46 is turned ON, the power is supplied from the buttery 49 to a starting motor 50, to thereby drive the starting motor 50. The output port 36 is connected to each spark plug 9, each fuel injector 14, and the first and the second vacuum control valves 19 and 21 of the actuator 16, via respective drive circuits 51.

Next, the control of the opening of the intake air control valve 17 will be explained.

In this embodiment, the target opening DTGT of the intake air control valve 17 is made zero when the ignition switch 47 is turned ON, to thereby close the intake air control valve 17. Then, the intake air control valve 17 is kept closed, when the starting motor switch 46 is turned ON and thereby the engine starting operation starts. As a result, the intake air in the engine starting operation is an air present in the intake port 6 and branch 10 downstream of the intake air control valve 17 and an air flowing through the aperture 17a provided in the intake air control valve 17. Namely, the intake air amount in the engine starting operation is made very small. The small amount of the intake air reduces the amount of injected fuel, to thereby reduce the amount of unburned hydrocarbons exhausted into the exhaust manifold 8a in the engine starting operation.

Further, in the engine starting operation, the large negative pressure is produced in the branch 10 downstream of the intake air control valve 17. This large negative pressure vaporizes and atomizes the injected fuel sufficiently. Further, the fuel attached to the wall of the intake port 6 is also removed by the large negative pressure, and is atomized sufficiently. The sufficiently atomized fuel is burned in the combustion chamber 4 properly, to thereby reduce the amount of unburned hydrocarbon exhausted into the exhaust manifold 8a in the engine starting operation.

In this way, the intake air control valve 17 is kept closed in the engine starting operation. After the engine starting operation completes, the intake air control valve 17 is opened. The engine starting operation is judged to be in process from when the starting motor switch 46 is turned ON, until the engine speed N is larger than a predetermined speed N1, such as 400 rpm, in this embodiment. Namely, the intake air control valve 17 is opened when N>N1. This increases the intake air amount and prevent a lack of an engine output torque due to a lack of the intake air, after the engine starting operation completes. Note that, in this embodiment, the target opening DTGT of the intake air control valve 17 is made the intermediate opening MID in a low load engine operation, that is, when the engine load is lower than a predetermined load. Thus, the intake air control valve 17 is controlled to make the opening thereof equal to the intermediate opening MID just after the engine starting operation completes. In a high load engine operation, that is, when the engine load is higher than the predetermined load, the target opening DTGT is made the maximum opening MAX, to thereby assure the larger intake air amount and the larger output torque.

Next, the calculation of the fuel injection time will be explained.

The fuel injection time TAU in the engine starting operation is calculated using the following equation (1):

$$TAU = TBS \cdot KN \cdot KC \quad (1)$$

where coefficients express the following:

TBS: basic fuel injection time in the engine starting operation

KN: correction coefficient based on the engine speed

KC: correction coefficient based on the conditions

Figure 3:
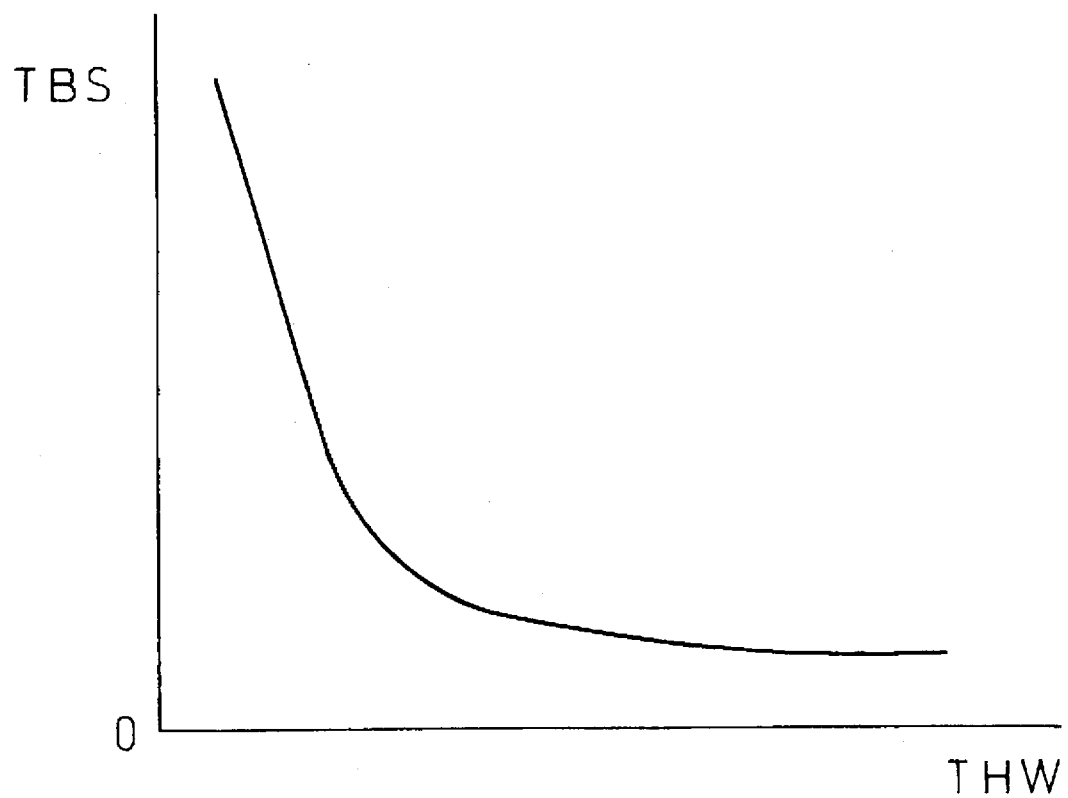
FIG. 3 is a diagram illustrating a basic fuel injection time in an engine starting operation.

The basic fuel injection time in the engine starting operation TBS is an injection time required for preventing the large amount of unburned hydrocarbons exhausted into the exhaust manifold 8a and for finishing the engine starting operation successfully and rapidly, and is obtained by experiments in advance. The basic fuel injection time in the engine starting operation TBS becomes longer as the engine cooling water temperature THW becomes lower, as shown in FIG. 3. The intake air amount is substantially constant over the engine starting operation, and this amount becomes larger as the cooling water temperature THW becomes lower. Thus, the calculation of the fuel injection time TAU based on TBS which becomes larger as the cooling water temperature THW becomes lower, and the fuel injection with this fuel injection time TAU prevents the large amount of unburned hydrocarbons exhausted into the exhaust manifold 8a, and assures the successful and rapid completion of the engine starting operation. Note that the basic fuel injection time in the engine starting operation TBS is stored, in advance, in the ROM 32 in the form of the map as shown in FIG. 3.

The correction coefficient KN is for correcting the basic fuel injection time TBS based on the engine speed N in the engine starting operation. The correction coefficient KC expresses together a correction coefficient based on the temperature of the intake air, a correction coefficient based on the atmospheric pressure, and a correction coefficient based on the battery voltage. KN or KC is made 1 when there is no need for correction.

On the other hand, the fuel injection time TAU after the completion of the engine starting operation is calculated based on the intake air amount QA, using the following equation (2):

$$TAU = TBA \cdot FAF \cdot KC \cdot KI \cdot (1-KD) \quad (2)$$

where coefficients express the followings:

TBA: basic fuel injection time after the completion of the engine starting operation FAF: feedback correction coefficient KI: increasing correction coefficient KD: reducing correction coefficient The basic fuel injection time after the completion of the engine starting operation TBA is calculated as follows:

$$TBA = QA \cdot CC$$

where coefficients express the followings:

QA: intake air amount

CC: conversion coefficient

The basic fuel injection time after the completion of the engine starting operation TBA is a fuel injection time required for making the air-fuel ratio of the air-fuel mixture equal to the target air-fuel ratio, such as a stoichiometric air-fuel ratio, when the intake air amount is QA.

The conversion coefficient CC is obtained, in advance, by experiment. The feedback correction coefficient FAF is for making the air-fuel ratio equal to the target air-fuel ratio based on the signals from the air-fuel ratio sensor 28, and fluctuates around 1. The increasing correction coefficient KI expresses together, for example, the coefficient of increase during warm-up, and the correction coefficient of increase during acceleration. KI is made 1 when there is no need for correction.

The reducing correction coefficient KD is for reducing the fuel amount to be injected during a delay period of the intake air control valve 17 (explained hereinafter), and is between zero and 1. Next, the explanation regarding the reducing correction coefficient KD will be made with reference to FIG. 4.

Figure 4:
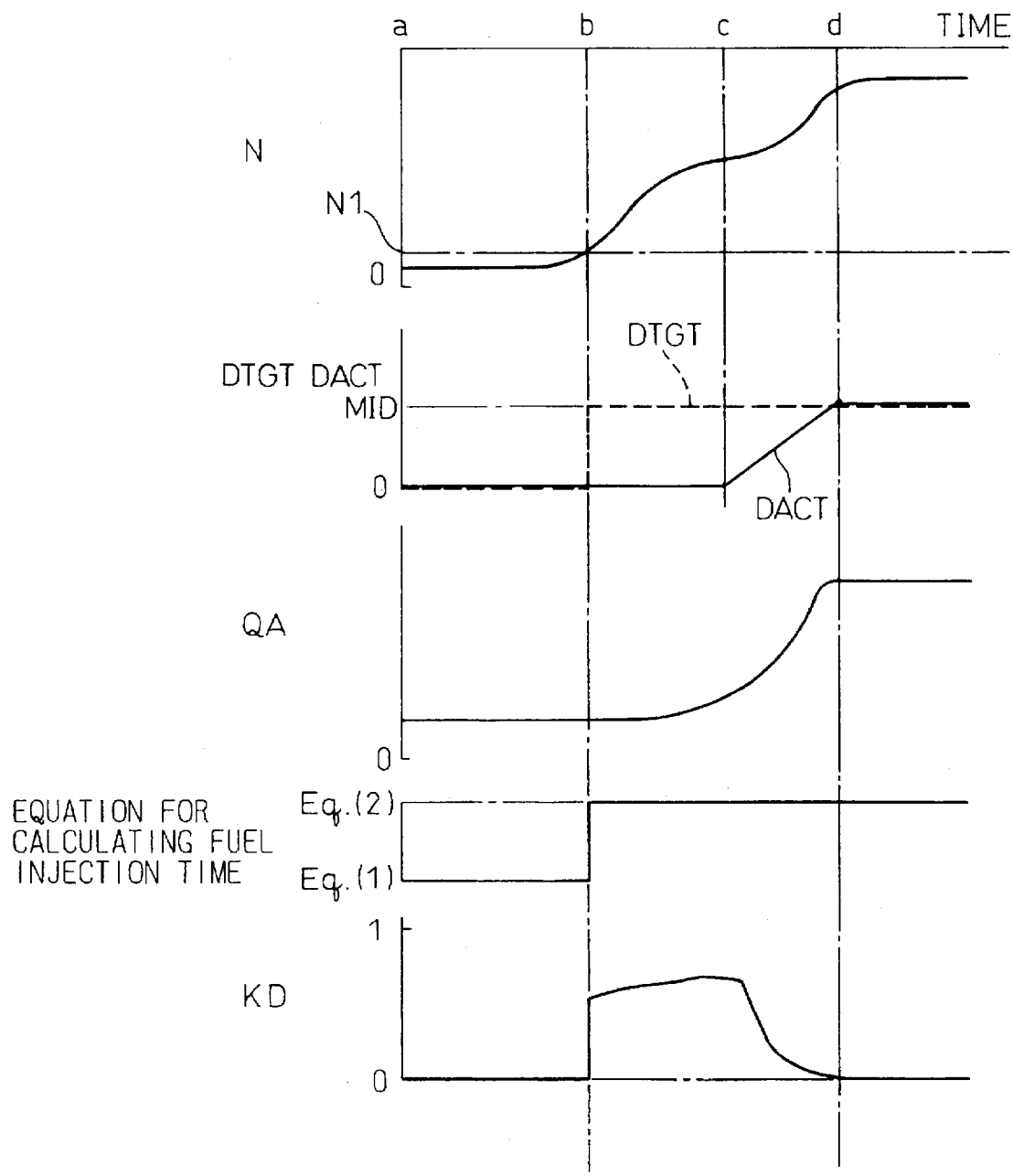
FIG. 4 is a time chart in and after an engine starting operation.

FIG. 4 shows a time chart during and after the engine starting operation. The time a in FIG. 4 is a time when starting motor switch 46 is turned ON, namely, the engine starting operation starts. As shown in FIG. 4, the engine speed N is substantially constant, for a while, after the engine starting operation starts. At the time b, the engine speed N increases over the predetermined speed N1. Thus, the engine starting operation is in process from the time a to the time b, in the example shown in FIG. 4.

In the engine starting operation, the target opening DTGT is kept zero and the actual opening DACT is also kept zero. At the time b, that is, when N>N1 and the engine starting condition completes, the target opening DTGT is made MID. However, although the target opening DTGT is made MID, the intake air control valve 17 does not open immediately, namely, the actual opening DACT is kept zero. Then, at the time c, the intake air control valve 17 starts to open, and at the time d, finally, the actual opening DACT becomes equal to the target opening MID. When referring to the period from when the opening of the intake air control valve 17 is controlled to be made MID, namely, when the engine starting operation has completed until the actual opening DACT becomes equal to MID which is the target opening as a delay period of the intake air control valve 17, the delay period in the example shown in FIG. 4 is from the time b until the time d. Although such a delay period is preferably as short as possible, the delay period is actually present to a certain extend. In particular, when the driver 16 is constituted as the negative pressure type actuator as in this embodiment, the delay period becomes relatively longer. Note that the delay period may become longer, if the negative pressure in the branch downstream of the intake air control valve 17 is introduced directly into the first and the second vacuum chambers 20 and 22 without providing the vacuum storing chamber 18.

During the delay period, the intake air control valve 17 is closed, or the actual opening DACT is smaller than the target opening MID. This prevents an increase in the intake air amount, although the intake air amount must increase.

On the other hand, the fuel injection time TAU is calculated based on the negative pressure in the surge tank 11, using the equation (2) after the time b, that is, after the completion of the engine starting operation. However, although the engine starting operation is finished, the actual opening DACT is smaller than the intermediate opening MID. Thus, the negative pressure in the surge tank 11 during the delay period is substantially atmospheric pressure and is smaller than that when the actual opening DACT is the intermediate opening MID, at the identical engine speed. Thus, during the delay period, the intake air amount QA calculated based on the negative pressure in the surge tank 11 is larger than the actual intake air amount QAA. In this condition, if the fuel injection time TAU is calculated as TBA·FAF·KC·KI, the fuel amount is larger than that required to make the air-fuel ratio equal to the target air-fuel ratio. This results in deteriorating the combustion of the air-fuel mixture in the combustion chamber 4, to thereby increase the amount of unburned hydrocarbons exhausted into the exhaust manifold 8a. Additionally, this large amount of fuel may attach to the spark plug 9 to thereby stop the fuel igniting.

Therefore, in this embodiment, the opening sensor 43 is provided for detecting the actual opening of the intake air control valve 17 to thereby detect the delay period, namely, the period during which the actual opening DACT is smaller than the target opening DTGT. During the delay period, the fuel injection time TAU is calculated based on the negative pressure in the surge tank 11, and a reduction amount is deducted from the fuel injection time TAU. Namely, using the reducing correction coefficient KD, the fuel injection time TAU is calculated by subtracting TBA·FAF·KC·KI·KD from TBA·FAF·KC·KI, during the delay period. As a result, the fuel amount actually injected is made equal to the required amount to make the air-fuel ratio equal to the target air-fuel ratio. This assures a good combustion of the air-fuel mixture in the combustion chamber 4, and prevents a large amount of unburned hydrocarbons from being exhausted into the exhaust manifold 8a. Also, this assures successful ignition by the spark plug 9.

Figure 5A:
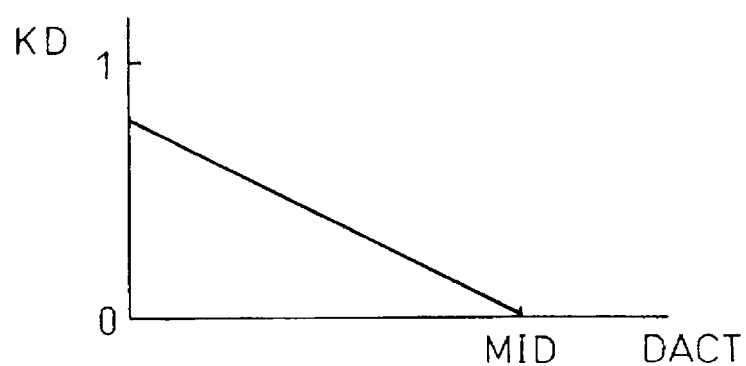
FIGS. 5A to 5C are diagrams illustrating a reducing correction coefficient.
Figure 5B:
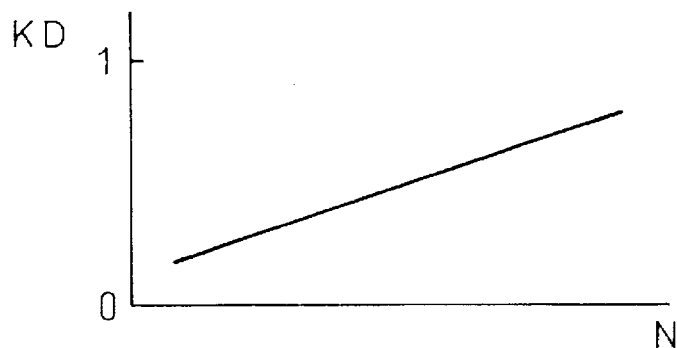
Figure 5C:
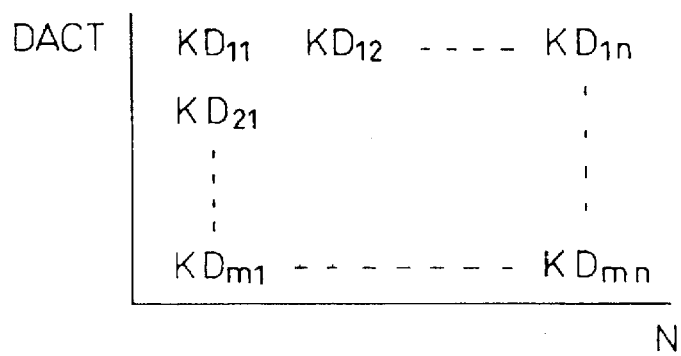

The reducing correction coefficient KD is, in this way, for making the air-fuel ratio equal to the target air-fuel ratio during the delay period, and is obtained, in advance, by experiment. The reducing correction coefficient KD becomes smaller as the actual opening DACT becomes closer to the intermediate opening MID, and is kept zero when DACT≧MID, as shown in FIG. 5A. Further, the reducing correction coefficient KD becomes smaller as the engine speed N becomes smaller, as shown in FIG. 5B. Note that the reducing correction coefficient KD is stored, in advance, in the ROM 32 in the form of the map as shown in FIG. 5C.

During the delay period, the deviation of the calculated intake air amount QA based on the negative pressure in the surge tank 11 from the actual intake air amount QAA becomes smaller, as the actual opening DACT becomes larger, namely, the deviation of the actual opening DACT from the target opening MID. Also, the deviation of QA becomes smaller as the engine speed N becomes smaller. Therefore, the reducing amount, that is, the reducing correction coefficient KD should become smaller, as the deviation of DACT becomes smaller, and as the engine speed N becomes lower.

In the example shown in FIG. 4, at the time b in which the delay period starts, the reducing correction coefficient KD increases quickly, then is kept substantially constant for a while, then decreases gradually, and becomes substantially zero at the time d in which DACT=MID (=DTGT). Note that, after the delay period, the calculated intake air amount QA conforms to the actual amount QAA, and thus, the calculation based on the calculated intake air amount QA provides the appropriate fuel injection time.

Even when the actual opening DACT of the intake air control valve 17 is smaller than the intermediate opening MID which is target opening DTGT during the delay period, a small amount of the intake air flows through the aperture 17a of the intake air control valve 17, and the intake air amount becomes larger when the intake air control valve 17 partially opens. The amount of the intake air flowing in this way becomes larger as the opening TA of the throttle valve 15 becomes larger. In other words, the deviation of the detected intake air amount QA from the actual intake air amount QAA becomes smaller as the throttle opening TA becomes larger. Accordingly, the reducing correction coefficient KD is needed to become smaller as the throttle opening TA becomes larger.

The reducing correction coefficient KD shown in FIGS. 5A to 5C is suitable when the throttle opening TA is a minimum opening thereof, that is, an idling opening. Therefore, a correction coefficient KTA for correcting the reducing correction coefficient KD, which is made 1 when the throttle opening TA is zero, that is, an idling opening, and becomes smaller as the throttle opening TA becomes larger, is provided. The reducing correction coefficient KD is calculated as a product of KD obtained using the map shown in FIG. 5C and KTA, during the delay period. This makes the fuel amount actually injected closer to the suitable amount during the delay period.

In particular, just after the completion of the engine starting operation, such as during the delay period, the reliability of the opening sensor 39 is relatively low. Therefore, the correction of the reducing correction coefficient KD by the coefficient KTA based on the throttle opening TA assures the appropriate reduction of fuel injection amount, and thereby decreases the amount of unburned hydrocarbons exhausted into the exhaust manifold 8a during the delay period.

Next, routines for executing the above-mentioned embodiment will be explained with reference to FIGS. 7 to 9.

Figure 7:
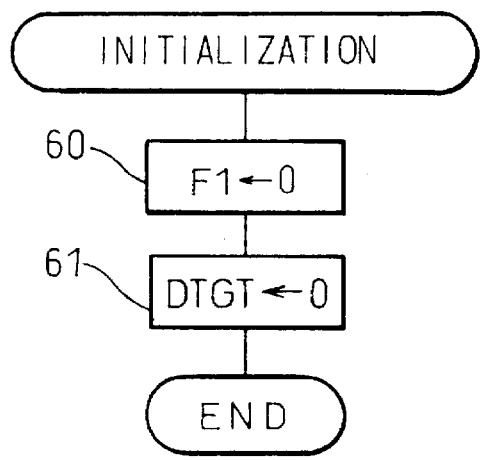
FIG. 7 shows a flowchart for executing an initialization.

FIG. 7 illustrates a routine for executing an initialization. This routine is executed only once when the ignition switch 47 is turned ON.

Referring to FIG. 7, first, in step 60, a factor F1 is made zero. The factor F1 is made zero before or during the engine starting operation, and is made 1 after the completion of the engine starting operation. In following step 61, the target opening DTGT of the intake air control valve 17 is made zero. Thus, the intake air control valve 17 is closed at this time. Then, the processing cycle is ended.

Figure 8:
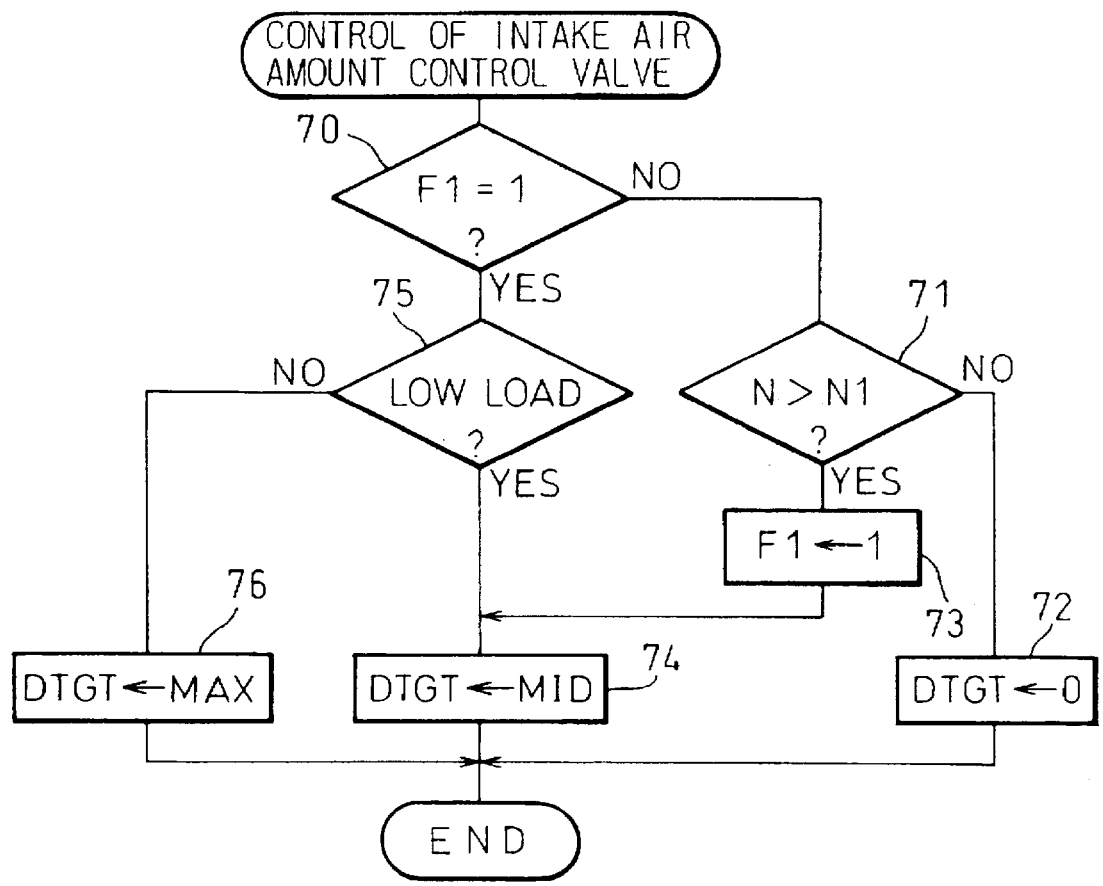
FIG. 8 shows a flowchart for controlling an intake air control valve.

FIG. 8 illustrates a routine for controlling the opening of the intake air control valve 17. This routine is executed by interruption every predetermined time. Referring to FIG. 8, first, in step 70, it is determined whether the factor F1 is made 1, namely, the engine starting operation has completed. When it is first time for the routine to go to step 70 after the ignition switch 47 is turned ON, the factor F1 is zero, and thus the routine goes to step 71. In step 71, it is determined whether the engine speed N is higher than the predetermined speed N1. If N≤N1, the engine starting operation is judged not to complete, and the routine goes to step 72, where the target opening DTGT is kept zero. Accordingly, the intake air control valve 17 is kept closed until the engine starting operation completes. Then, the processing cycle is ended.

Contrarily, if N>N1 in step 71, the engine starting operation is judged to be complete, and the routine goes to step 73 where the factor F1 is made 1. Then, the routine goes to step 74 where the target opening DTGT is made the intermediate opening MID. Thus, the intake air control valve 17 is controlled to make the opening thereof equal to the intermediate opening MID. Accordingly, the intake air control valve 17 is controlled to open after the completion of the engine stating operation. Then, the processing cycle is ended.

In the following processing cycle, the factor F1=1, and thereby the routine goes from step 70 to step 75. In step 75, it is determined whether the engine operation is the low load operation. If the engine operation is the low load operation, the routine goes to step 74, the target opening DTGT is made the intermediate opening MID. Thus, the intake air control valve 17 is controlled to make the opening thereof equal to MID. On the contrary, in step 75, if the engine operation is not the low load operation, namely, the engine operation is high load operation and the routine goes to step 76 where the target opening DTGT is made the maximum opening MAX. Thus, the intake air control valve 17 is controlled to make the opening thereof equal to MAX. Then, the processing cycle is ended.

Figure 9:
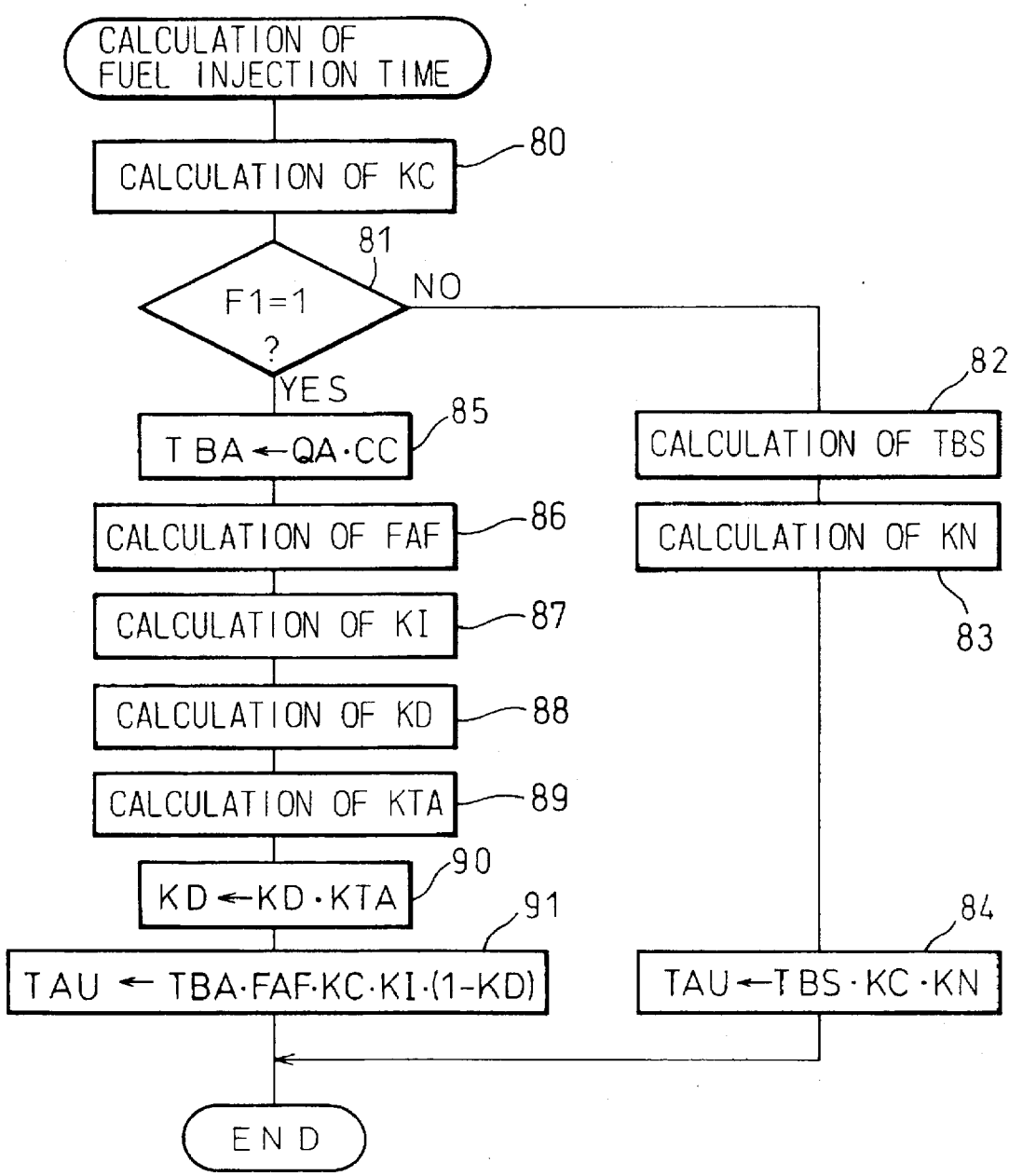
FIG. 9 shows a flowchart for calculating a fuel injection time.

FIG. 9 illustrates a routine for calculating the fuel injection time. This routine is executed by interruption every predetermined crank angle.

Referring to FIG. 9, first, in step 80, the correction coefficient based on the atmospheric condition KC is calculated. In following step 81, it is determined whether the factor F1 is made 1. If F1=0, namely, the engine starting operation is in process, the routine goes to step 82 where the basic fuel injection time in the engine starting operation TBS is calculated based on the engine cooling water temperature THW, using the map shown in FIG. 3. In following step 83, the fuel injection time TAU is calculated using the following equation:

$$TAU=TBS \cdot KN \cdot KC$$

The fuel is injected from the fuel injector 14 based on the fuel injection time TAU in the engine starting operation. Then, the processing cycle is ended.

Contrarily, if F1=1, in step 81, namely, after the engine starting operation completes, the routine goes to step 85, where the basic fuel injection time after the completion of the engine starting operation TBA is calculated using the following equation:

$$TBA=QA \cdot CC$$

Figure 6:
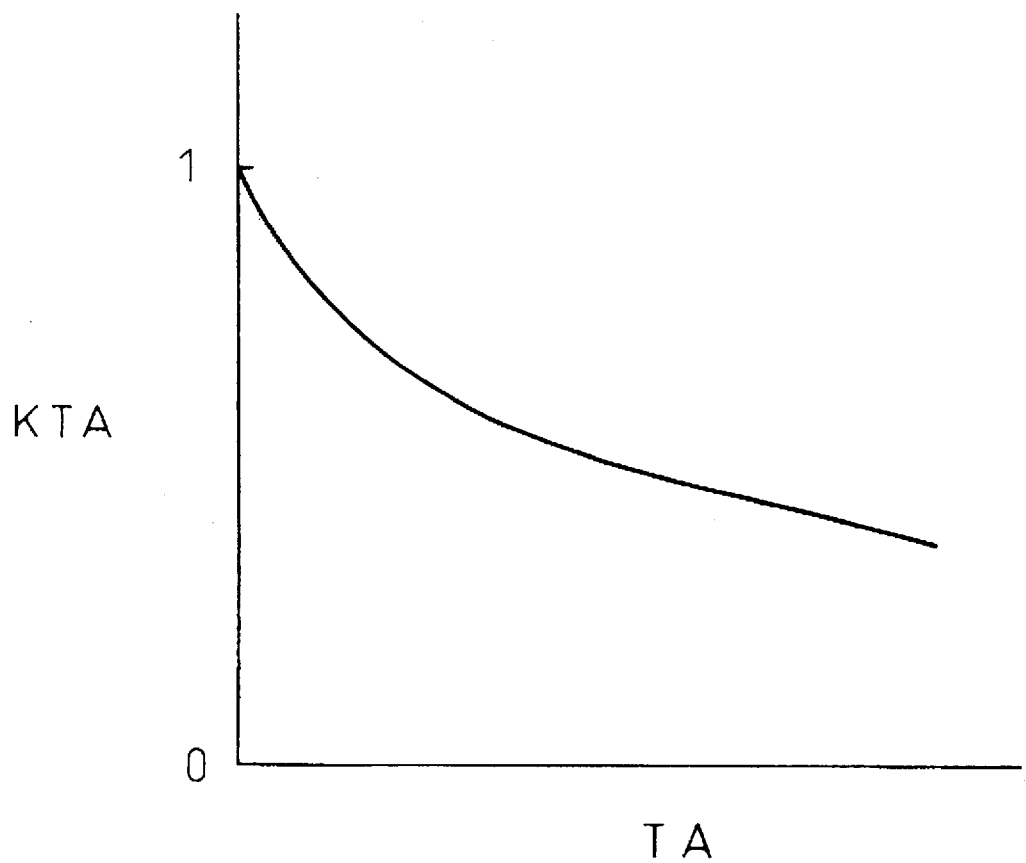
FIG. 6 is a diagram illustrating a throttle valve opening correction coefficient.

In the following steps 86 and 87, the feedback correction coefficient FAF and the increasing correction coefficient KI are calculated, respectively. In the following steps 88 and 89, the reducing correction coefficient KD and the correction coefficient KTA based on the throttle opening TA are calculated using the map shown in FIG. 5C and the map shown in FIG. 6, respectively. In the following step 90, the reducing correction coefficient KD is calculated using the following equation:

$$KD=KD \cdot KTA$$

In the following step 91, the fuel injection time TAU is calculated using the following equation:

$$TAU=TBA \cdot FAF \cdot KC \cdot KI \cdot (1-KD)$$

The fuel is injected from the fuel injector 14 based on the fuel injection time TAU after the completion of the engine starting operation. Then, the processing cycle is ended.

Next, another embodiment for calculating the reducing correction coefficient KD will be explained.

Figure 10:
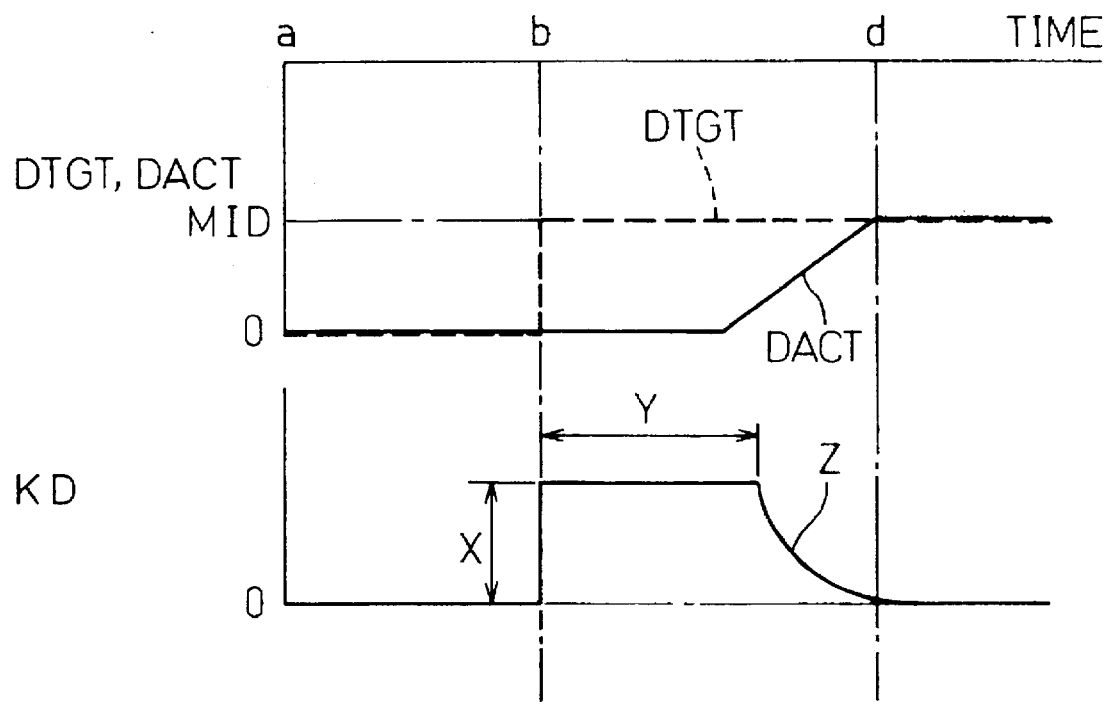
FIG. 10 is a time chart for illustrating coefficients X, Y and Z, according to another embodiment of the present invention.

In this embodiment, the reducing correction coefficient KD is calculated using coefficients X, Y, and Z, which are determined based on the engine operating condition, such as the engine cooling water temperature THW. Namely, as shown in the time chart of FIG. 10, at the time b in which the engine starting operation has completed, first, the reducing correction coefficient KD is made an initial value X to thereby increase the coefficient KD quickly. This initial value X is between zero and 1. When the keeping time Y has passed after the coefficient KD is made X, the coefficient KD is decreased by an attenuation coefficient Z. Namely, after the coefficient KD is kept X for the keeping time Y, the coefficient KD is periodically calculated using the following equation:

$$KD=KD \cdot Z$$

The attenuation coefficient Z is between zero and 1. Then, at the time d in which the actual opening DACT substantially conforms to the intermediate opening MID which is the target opening DTGT, the reducing correction coefficient KD becomes substantially zero. Note that the time a in FIG. 10 indicates a time at which the engine starting operation starts.

Figure 11A:
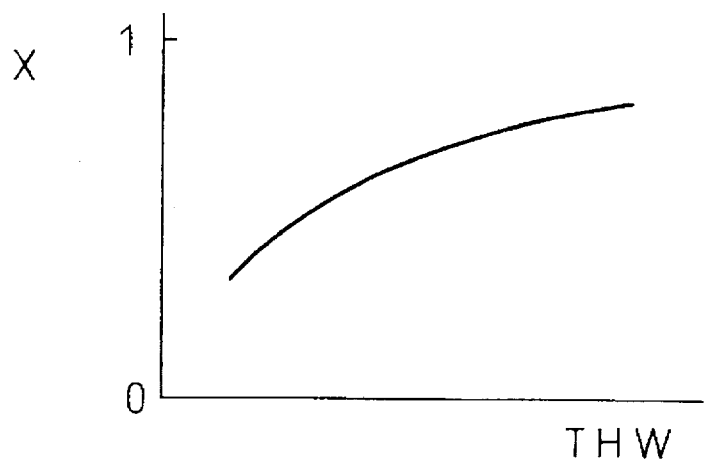
FIGS. 11A to 11C are diagrams illustrating coefficients X, Y, and Z, respectively.
Figure 11B:
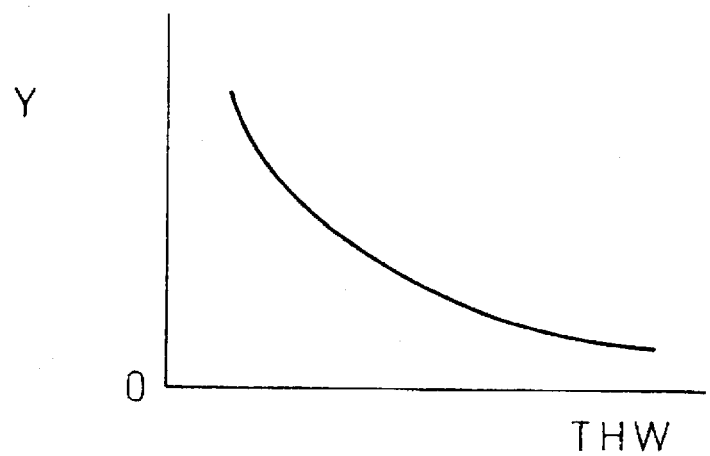
Figure 11C:
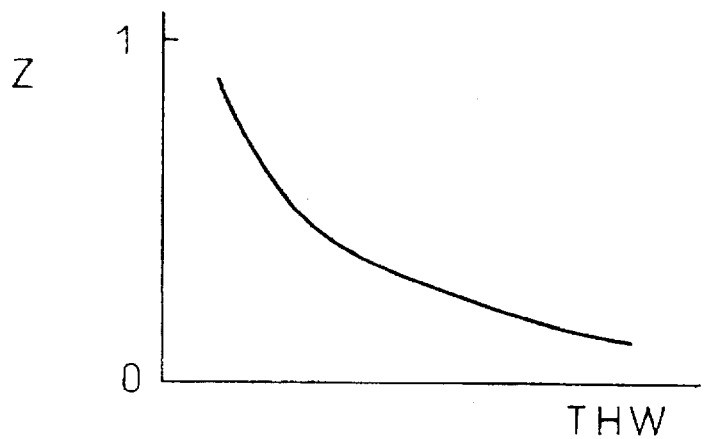

The coefficients X, Y, and Z are obtained, in advance, by experiment, to make the reducing correction coefficient KD suitable. The initial value X becomes larger as the cooling water temperature THW becomes higher, as shown in FIG. 11A. The keeping time Y becomes shorter as THW becomes higher, as shown in FIG. 11B. The attenuation coefficient Z becomes smaller as THW becomes higher, as shown in FIG. 11C. The coefficients X, Y, and Z are stored, in advance, in the ROM 32 in the form of the maps as shown in FIGS. 11A to 11C.

Note that the delay period is estimated in accordance with the cooling water temperature THW, in this embodiment, and thus, there is no need for providing the opening sensor 43 for detecting the actual opening of the intake air control valve 17.

Figure 12:
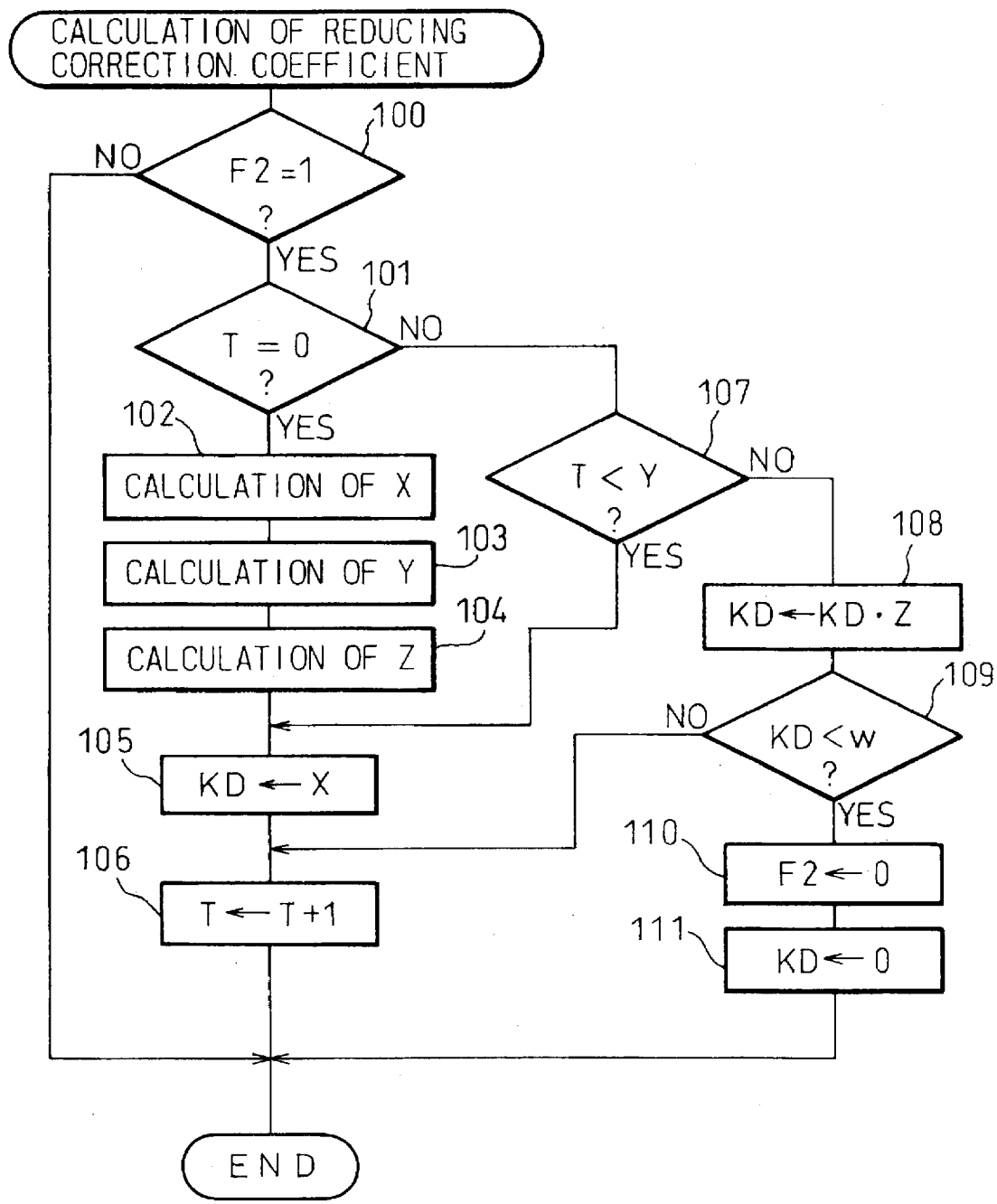
FIG. 12 is a flowchart for calculating a reducing correction coefficient, according to another embodiment of the present invention.

FIG. 12 illustrates a routine for calculating the reducing correction coefficient KD. This routine is executed in, for example, step 88 in the routine shown in FIG. 9.

Referring to FIG. 12, first, in step 100, it is determined whether a factor F2 is made 1. The factor F2 is made 1 during the delay period, and is made zero when the actual opening DACT conforms to the target opening DTGT. The factor F2 has been made 1 in, for example, the initialization. Thus, when it is first time for the routine to go to step 100 after the engine starting operation completes, F2=1 and thereby the routine goes to step 101. In step 101, it is determined whether a counter value T, which represents the delay period, is made zero. The counter value T has been made zero in, for example, the initialization. Thus, when it is the first time for the routine to go to step 101, T=0 and thereby the routine goes to steps 102, 103, and 104, in turn.

In steps 102, 103, and 104, the initial value X, the keeping time Y, and the attenuation coefficient Z are calculated using the maps shown in FIGS. 11A, 11B, and 11C, respectively. In following step 105, the reducing correction coefficient KD is made the initial value X. In following step 106, the counter value T is incremented by 1, and then, the processing cycle is ended.

In the following processing cycle, the routine goes to step 101 to step 107 where it is determined whether the counter value T is smaller than the keeping time Y. If T<Y, the routine jumps to step 105. This results in keeping the reducing correction coefficient KD the initial value X. Then, the counter value T is incremented in step 106. Contrarily, if T≧Y in step 107, the routine goes to step 108 where the reducing correction coefficient KD is calculated using the following equation:

$$KD = KD \cdot Z$$

Accordingly, the reducing correction coefficient KD is kept the initial value X from when the delay period starts until the keeping time Y has passed. In the following step 109, it is determined whether the reducing correction coefficient KD is smaller than a very small constant w. If KD≧w, the routine jumps to step 106. Thus, the reducing correction coefficient KD is made smaller by every processing cycle. If KD<w in step 109, it is judged to be no longer in the delay period and the routine goes to step 110 where the factor F2 is made zero. In the following step 111, the reducing correction coefficient KD is also made zero, and then the processing cycle is ended.

In the following processing cycle, the routine goes to step 100, and then the processing cycle is ended, because F2 is made zero. Accordingly, the reducing correction coefficient KD is kept zero when it is not in the delay period.

In the embodiments mentioned above, the engine starting operation is judged to be complete when the engine speed N is higher than the predetermined speed N1. Alternatively, a pressure sensor may be provided in the branch 10 downstream of the intake air control valve 17 for detecting the negative pressure therein, and the engine starting operation may be judged to be complete when the negative pressure in the branch 10 downstream of the intake air control valve 17 is larger than a predetermined negative pressure.

Further, in the embodiments mentioned above, the basic fuel injection time in the engine starting operation TBS, and the coefficients X, Y, and Z are calculated based on the engine cooling water temperature THW, respectively. Alternatively, TBS, X, Y, and Z may be calculated based on another engine temperature such as the temperature of the engine oil, of the walls of the cylinder block 1 or the branch 10, or the intake air.

According to the present invention, it is possible to provide a fuel injection control device for engine able to calculate the appropriate fuel injection time during the delay period of the intake air control valve.

While the invention has been described by reference to specific embodiments chosen for purposes of illustration, it should be apparent that numerous modifications could be made thereto by those skilled in the art without departing from the basic concept and scope of the invention.

We claim:

1. A fuel injection control device for an engine having an intake passage and an intake air control valve arranged therein and controlled by an actuator, the actuator controlling the intake air control valve to be closed in an engine starting operation and to be opened after the completion of the engine starting operation, the device comprising:

a fuel injector arranged in the intake passage downstream of the intake air control valve for injecting fuel into the intake passage;

a pressure sensor arranged in the intake passage upstream of the intake air control valve for detecting a negative pressure therein;

engine starting operation determining means for determining whether the engine starting operation is in process or has completed;

first fuel amount calculating means for calculating a fuel amount to be injected by the fuel injector based on the negative pressure detected by the pressure sensor when the determining means determines that the engine starting operation has completed;

delay period detecting means for detecting a delay period of the intake air control valve; and fuel amount reducing means for reducing the fuel amount calculated by the first fuel amount calculating means during the delay period.

2. A device according to claim 1, wherein the fuel amount reducing means comprises opening detecting means for detecting an actual opening of the intake air control valve, and wherein the fuel amount reduced by the fuel amount reducing means becomes larger when the actual opening of the intake air control valve becomes smaller.

3. A device according to claim 1, wherein the fuel amount reduced by the fuel amount reducing means becomes larger when the engine speed becomes higher.

4. A device according to claim 1, further comprising a temperature sensor for detecting an engine temperature, and wherein the fuel amount reducing means reduces the fuel amount calculated by the first fuel amount calculating means based on the engine temperature.

5. A device according to claim 4, wherein the fuel amount reduced by the fuel amount reducing means is made an initial amount when the engine starting operation determining means determines that the engine starting operation has completed, is kept at the initial amount for a keeping time, and is decreased with an attenuation coefficient, and wherein the initial amount, the keeping time, and the attenuation coefficient are determined based on the engine temperature.

6. A device according to claim 5, wherein the initial amount becomes larger when the engine temperature becomes higher.

7. A device according to claim 5, wherein the keeping time becomes longer when the engine temperature becomes lower.

8. A device according to claim 5, wherein the attenuation coefficient becomes larger when the engine temperature becomes lower.

9. A device according to claim 4, wherein the engine temperature is an engine cooling water temperature.

10. A device according to claim 1, wherein the engine further includes a throttle valve in the intake passage upstream of the intake air control valve.

11. A device according to claim 10, wherein the fuel amount reducing means comprises opening detecting means for detecting an opening of the throttle valve, and wherein the fuel amount reduced by the fuel amount reducing means becomes smaller when the opening of the throttle valve becomes larger.

12. A device according to claim 10, wherein the pressure sensor is arranged in the intake passage between the intake air control valve and the throttle valve.

13. A device according to claim 1, wherein the actuator comprises: a vacuum chamber into which the negative pressure is adapted to be introduced; a diaphragm defining the vacuum chamber and connected to the intake air control valve, the displacement thereof becoming larger when the negative pressure in the vacuum chamber becomes larger, to thereby make the opening of the intake air control valve larger; and a vacuum control valve connecting the vacuum chamber selectively to a vacuum source or the atmosphere, and wherein the vacuum control valve connects the vacuum chamber to the atmosphere when the engine starting operation determining means determines that the engine starting operation is in process, and to the vacuum source when the engine starting operation determining means determines that the engine starting operation completes.

14. A device according to claim 13, wherein the actuator further comprises a vacuum storing chamber connected to the intake passage for storing the negative pressure produced therein, and wherein the vacuum source is the vacuum storing chamber.

15. A device according to claim 1, wherein the fuel amount TAU calculated by the first fuel amount calculating means is expressed as the following equation:

$$TAU=TBA*FAF*KC*KI*(1-KD)$$

where the coefficients express the following:
TBA: basic fuel injection amount after the completion of the engine starting operation
FAF: feedback correction coefficient
KC: correction coefficient based on at least one engine operating condition
KI: increasing correction coefficient
KD: reducing correction coefficient and the basic fuel injection amount after the completion of the engine starting operation TBA is calculated as follows:

$$TBA=QA*CC$$

where the coefficients express the following:
QA: intake air amount
CC: conversion coefficient.

16. A device according to claim 1, wherein the intake air control valve is controlled to make the opening thereof equal to a target opening when the engine starting operation determining means determines that the engine starting operation has completed, and wherein the delay period detecting means comprises an opening detecting means for detecting the actual opening of the intake air control valve, and detects that it is in the delay period from when the engine starting operation determining means determines that the engine starting operation has completed until the actual opening of the intake air control valve conforms to the target opening.

17. A device according to claim 1, wherein the engine starting operation determining means determines that the engine starting operation has completed when the engine speed increases over a predetermined speed.

18. A device according to claim 1, further comprising a temperature sensor for detecting an engine temperature, and second fuel amount calculating means for calculating a fuel amount to be injected by the fuel injector based on the engine temperature detected by the temperature sensor, regardless the intake air amount, when the determining means determines that the engine starting operation is in process.

19. A device according to claim 18, wherein the engine temperature is an engine cooling water temperature.

20. A device according to claim 18, wherein the fuel amount calculated by the second fuel amount calculating means becomes larger when the engine temperature becomes lower.

21. A device according to claim 18, wherein the fuel amount TAU calculated by the second fuel amount calculating means is expressed by the following equation:

$$TAU=TBS*KN*KC$$

where the coefficients express the following:
TBS: basic fuel injection amount in the engine starting operation
KN: correction coefficient based on the engine speed
KC: correction coefficient based on at least one engine operating condition.

22. A device according to claim 1, wherein the actuator controls the intake air control valve to make the opening thereof equal to an intermediate opening when the engine load is lower than a predetermined load, and to fully open when the engine load is higher than the predetermined load, when the engine starting operation determining means determines that the engine starting operation has completed.

* * * * *